(12) United States Patent
Berggren et al.

(10) Patent No.: US 11,665,667 B2
(45) Date of Patent: May 30, 2023

(54) FLEXIBLE PAGING PROCEDURE

(71) Applicant: Sony Group Corporation, Tokyo (JP)

(72) Inventors: Anders Berggren, Lund (SE); Rickard Ljung, Helsingborg (SE); Basuki Priyanto, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/055,589

(22) PCT Filed: Apr. 29, 2019

(86) PCT No.: PCT/EP2019/060968
§ 371 (c)(1),
(2) Date: Nov. 15, 2020

(87) PCT Pub. No.: WO2019/219367
PCT Pub. Date: Nov. 21, 2019

(65) Prior Publication Data
US 2021/0227495 A1 Jul. 22, 2021

(30) Foreign Application Priority Data
May 18, 2018 (SE) .................................. 1830165-5

(51) Int. Cl.
*H04W 68/02* (2009.01)
*H04W 68/04* (2009.01)
(Continued)

(52) U.S. Cl.
CPC ....... *H04W 68/02* (2013.01); *H04W 52/0216* (2013.01); *H04W 76/28* (2018.02)

(58) Field of Classification Search
CPC . H04W 68/02; H04W 52/0216; H04W 76/28; H04W 68/08; H04W 76/27; H04W 68/04; Y02D 30/70
(Continued)

(56) References Cited

U.S. PATENT DOCUMENTS

2016/0157208 A1 6/2016 Liang et al.
2016/0262109 A1* 9/2016 Chen ...................... H04W 52/50
(Continued)

FOREIGN PATENT DOCUMENTS

CN 107925962 A 4/2018
EP 3119144 A1 1/2017
(Continued)

OTHER PUBLICATIONS

Huawei: "Paging Transmission for MTC UEs", 3GPP TSG RAN WG1 Meeting #80, R1-150064, Feb. 9-13, 2015, 3 pages.
(Continued)

*Primary Examiner* — Inder P Mehra
(74) *Attorney, Agent, or Firm* — Tucker Ellis LLP

(57) ABSTRACT

A method includes determining a parameter of a coverage enhancement policy employed by a communication system. The method also includes setting a timing configuration (371-373, 391-393, 605, 606) of a discontinuous reception cycle (370-2, 370-3) employed by a terminal (101) of the communication system depending on the parameter. The method also includes communicating a paging signal in accordance with the timing configuration (371-373, 391-393, 605, 606) of the discontinuous reception cycle (370-2, 370-3) and the coverage enhancement policy.

12 Claims, 8 Drawing Sheets

(51) Int. Cl.
   *H04W 68/08*   (2009.01)
   *H04W 52/02*   (2009.01)
   *H04W 76/28*   (2018.01)
   *H04W 76/27*   (2018.01)
(58) Field of Classification Search
   USPC .......................................................... 455/458
   See application file for complete search history.

(56) References Cited

U.S. PATENT DOCUMENTS

| | | | |
|---|---|---|---|
| 2017/0064670 A1 | 3/2017 | Shen | |
| 2017/0070312 A1* | 3/2017 | Yi | H04W 4/06 |
| 2017/0201963 A1* | 7/2017 | Zhang | H04W 76/28 |
| 2018/0097598 A1* | 4/2018 | Ang | H04W 52/0245 |
| 2018/0262989 A1 | 9/2018 | Wu | |
| 2020/0396632 A1* | 12/2020 | Ramachandra | H04L 5/0048 |

FOREIGN PATENT DOCUMENTS

| | | |
|---|---|---|
| JP | 2006246121 A | 9/2006 |
| JP | 2012010202 A | 1/2012 |
| WO | 2016072770 A1 | 5/2016 |
| WO | 2017051078 A1 | 3/2017 |
| WO | 2017074250 A1 | 5/2017 |
| WO | 2017171454 A1 | 10/2017 |

OTHER PUBLICATIONS

International Search Report and Written Opinion from corresponding International Application No. PCT/EP2019/060968, dated Jun. 17, 2019, 15 pages.
Sony, "MPDCCH for Paging at Multiple CE Levels", 3GPP TSG RAN WG1 Meeting #83, R1-156698, Nov. 15-22, 2015, 4 pages.
Samsung, "DRX Enhancements for Rel-13 Low Complexity MTC", 3GPP TSG RAN WG2 #91, R2-153446, Aug. 24-28, 2015, 4 pages.
Huswei, "Paging Transmission for MTC UEs", 3GPP TSG RAN WG1 Meeting #80, R1-150064, Feb. 9-13, 2015, 3 pages.
Ericsson, "Wake Up Signal", 3GPP TSG RAN2 Meeting #101bis, R2-1804962, Apr. 16-20, 2018, 9 pages.
Office Action from corresponding Japanese Application No. 2020-564558 dated Jan. 4, 2022, 5 pages.

* cited by examiner

FLEXIBLE PAGING PROCEDURE

TECHNICAL FIELD

Various examples of the invention generally relate to paging a terminal in accordance with a timing configuration of a discontinuous reception cycle of the terminal. Various examples of the invention specifically relate to setting the timing configuration.

BACKGROUND

Mobile communication using a communication device (also referred to as terminal or user equipment, UE) sometimes relies on one or more idle operational modes. In an idle operational, a wireless interface of the UE can be temporarily transitioned into an inactive state which is associated with a reduced power consumption if compared to an active state. The wireless interface, when operating in the inactive state, may not be able to receive all signals transmitted by the network. Then, in order for the network to initiate transmission of data, it is typically required to transmit one or more paging signals to the UE operating in the idle mode to trigger transition into a connected mode: in the connected mode, a data connection is set up between the UE and the network, the data connection facilitating the transmission of data.

Often, the idle mode is associated with discontinuous reception (DRX) cycle. Here, according to a timing configuration, the wireless interface transitions back and forth between the inactive state and the active state. This gives the network the opportunity to transmit the paging signal to the UE in accordance with the DRX cycle. The DRX cycle can thus be said to have ON-durations during which the wireless interface of the UE operates in the active state and OFF-durations during which the wireless interface of the UE operates in the inactive state. The ON-durations of the DRX cycle are associated with so-called paging occasions (POs), because the network has the opportunity to transmit a paging signal to the UE.

SUMMARY

A need exists for advanced techniques of operating a UE in an idle mode. Specifically, a need exists for advanced techniques of configuring a DRX cycle and associated POs.

This need is met by the features of the independent claims. The features of the dependent claims define embodiments.

A method includes determining a parameter of a coverage enhancement policy employed by a communication system. The method also includes setting a timing configuration of a discontinuous reception cycle employed by a terminal of the communication system depending on the parameter. The method also includes transmitting and/or receiving (communicating) a paging signal in accordance with the timing configuration of the discontinuous reception cycle and the coverage enhancement policy.

For example, the coverage enhancement policy may be employed by the terminal. Alternatively or additionally, the coverage enhancement policy may be employed by a base station of the communication system.

For example, the coverage enhancement policy may be employed to protect uplink data transmitted from the terminal to the base station. For example, the coverage enhancement policy may be employed to protect downlink data transmitted from the base station to the terminal.

A computer program product or computer program includes program code. The program code can be executed by at least one processor. The at least one processor, when executing the program code, can be configured to perform a method. The method includes determining a parameter of a coverage enhancement policy employed by a communication system. The method also includes setting a timing configuration of a discontinuous reception cycle employed by a terminal of the communication system depending on the parameter. The method also includes transmitting and/or receiving a paging signal in accordance with the timing configuration of the discontinuous reception cycle and the coverage enhancement policy.

A device is configured to determine a parameter of a coverage enhancement policy employed by a communication system; and to set a timing configuration of a discontinuous reception cycle employed by a terminal of the communication system depending on the parameter; and to communicate a paging signal in accordance with the timing configuration of the discontinuous reception cycle and the coverage enhancement policy.

For example, the device may include a control circuitry configured to perform these actions.

For example, the device may be a base station or a UE.

A method includes determining a mobility level of a terminal of a communication system. The method also includes setting a timing configuration of a discontinuous reception cycle employed by the terminal depending on the mobility level. The method also includes transmitting and/or receiving a paging signal in accordance with the timing configuration of the discontinuous reception cycle. For example, the paging signal may be communicated in accordance with a coverage enhancement policy.

A computer program product or computer program includes program code. The program code can be executed by at least one processor. The at least one processor, when executing the program code, can be configured to perform a method. The method includes determining a mobility level of a terminal of a communication system. The method also includes setting a timing configuration of a discontinuous reception cycle employed by the terminal depending on the mobility level. The method also includes transmitting and/or receiving a paging signal in accordance with the timing configuration of the discontinuous reception cycle. For example, the paging signal may be communicated in accordance with a coverage enhancement policy.

A device is configured to determine a mobility level of a terminal of a communication system. The device is also configured to set a timing configuration of a discontinuous reception cycle employed by the terminal depending on the mobility level. The device is also configured to transmit and/or receive a paging signal in accordance with the timing configuration of the discontinuous reception cycle. For example, the paging signal may be communicated in accordance with a coverage enhancement policy.

For example, the device may include a control circuitry configured to perform these actions.

For example, the device may be a base station or a UE.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
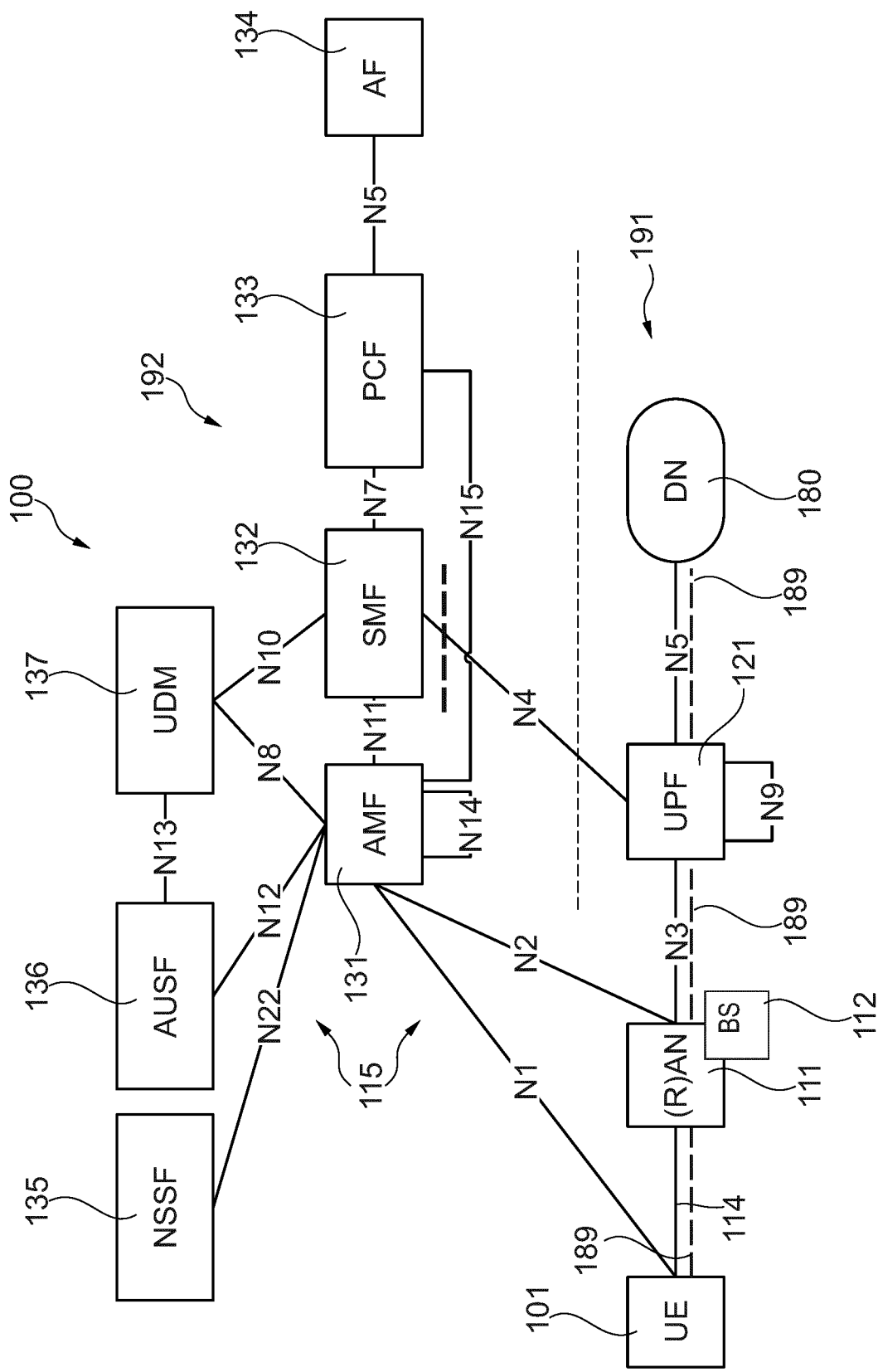
FIG. 1 schematically illustrates a cellular network implementing a communication system having a wireless link between a UE and a base station (BS) according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and a BS of a network, e.g., of a cellular network. The communication system may include a wireless link between the UE and the BS. Downlink (DL) signals may be transmitted by the BS and received by the UE. Uplink (UL) signals may be transmitted by the UE and received by the BS.

Hereinafter, techniques of operating a UE in various modes are described. The modes may include a connected mode and an idle mode.

A data connection may be established between the UE and a network in the connected mode; transmission of data—including application data or higher-layer control data, e.g., Layer 3 control data—may be implemented using the data connection. Differently, the data connection may be released in the idle mode.

The connected mode and/or the idle mode can be associated with a DRX cycle including ON-durations during which a wireless interface of the UE operates in an active state and further including OFF-durations during which the wireless interface of the UE operates in an inactive state.

In the idle mode, it may not be possible to directly commence with a data transmission during ON-durations of the DRX cycle. Rather, re-establishment of the data connection may be required first. To trigger re-establishment of the data connection, a paging signal may be communicated. The paging signal may be communicated in accordance with a timing configuration of the DRX cycle. The paging signal may be communicated during the ON-duration of the DRX cycle associated with the idle mode. This is typically referred to as PO. Sometimes, the paging signal may be preceded by a wake-up signal (WUS).

According to some examples, multiple paging signals may be communicated in an associated paging procedure, e.g., a paging indicator and a paging message. A paging procedure may include the following actions performed at the UE: (i) Listen for a WUS that indicates an upcoming paging signal for the UE; (ii) decode a DL control channel of a wireless link between the BS and the UE for a paging indicator at the POs if the WUS is detected; and (iii) decode a DL shared channel to receive a paging message, to thereby confirm if the paging indicator was intended for the specific UE or not.

The techniques described herein may be applied to accommodate for Internet of Things (IOT) traffic. In this regard, various work items in the Third Generation Partnership Project (3GPP) have been defined. Examples include Further Enhanced Machine Type Communications (feMTC), see 3GPP RP-161464; Enhanced Narrowband IOT (eNB-IOT), see 3GPP RP-161901; Even Further Enhanced Machine Type Communications (efeMTC), see 3GPP RP-170732; and Further Enhanced Narrowband Internet of Things (feNB-IOT), see 3GPP RP-170852. The techniques described herein may also be applied for conventional communication, e.g., using the 3GPP 4G Long Term Evolution (LTE) or 5G New Radio (NR) technology.

Various techniques described herein may employ a coverage enhancement (CE) policy. The CE policy may generally support increased transmission reliability across larger coverage areas. The CE policy may include one or more parameters to achieve this.

For example, the CE policy may include a parameter the value of which defines a repetition level (sometimes also referred to as CE level). UL signals and/or DL signals including a given redundancy version of encoded data are repeatedly communicated according to the repetition level: Hence, the same encoded data may be redundantly communicated a number of times according to various examples. Typically, different redundancy versions correspond to checksums of different length. In other examples, it would also be possible that different redundancy version employ checksums of the same length, but are encoded according to the different coding scheme. Alternatively or additionally, different redundancy versions may employ different interleaving schemes. Each repetition of the plurality of repetitions can include the data encoded according to the same redundancy version, e.g., redundancy version 0 or redundancy version 1, etc. Then, it is possible to combine the plurality of repetitions of the encoded data at the receiver side. I.e., multiple received repetitions of the signal may be combined. Such combination may be implemented in analog or digital domain, e.g., in the baseband. The combination yields a combined signal. Then, the decoding of the encoded data can be based on the combined signal. Thus, by aggregating the received information across the multiple repetitions of the signal, the probability of successfully decoding the data encoded by the signal increases. Depending on the repetition level, the transmission duration increases.

In a further example, the CE policy may include a parameter the value of which defines a scrambling factor. By scrambling, a sequence of bits can be encoded according to a scrambling algorithm. Depending on the scrambling algorithm, the transmission duration increases.

In yet a further example, the CE policy may include a parameter the value of which defines an error correction code (CRC). For example, a sequence of bits can be used to generate, based on a CRC algorithm, the CRC. Based on the CRC, correctness of the received sequence of bits can be checked and, if forward error correction (FEC) is employed, erroneously received bits of the sequence of bits can be corrected. Depending on the CRC algorithm, the transmission duration increases.

In yet a further example, the CE policy may include a parameter the value of which defines a transmission power level. Power boosting can be applied.

As a general rule, it is possible that the UE adjusts one or more parameters of the CE policy from time to time. I.e., the UE may adjust the values of one or more parameters from time to time. For example, the UE may sound the quality of communicating on the wireless link, e.g., by measuring a receive signal strength etc. Then, depending on the quality of the communicating on the wireless link, the one or more parameters of the CE policy may be adjusted. Thus, there may be a tendency that the frequency with which the UE adjusts the one or more parameters over the course of time is larger for a UE having a comparably large mobility level, because such a mobile UE will experience faster changes in the quality of communicating on the wireless link if compared to a UE having a comparably small mobility level. It is possible that the UE reports the current one or more parameters of the CE policy to the BS so that the one or more parameters are synchronized between UE and network (CE policy reporting).

As will be appreciated from the above, under a CE policy, various measures are available to increase the transmission reliability and/or to increase the coverage area. Some of these measures are associated with an increased duration of the signal transmission, as illustrated above for the repetition level, the spreading factor, the scrambling factor, and the error correction code.

Various techniques described herein are based on the finding that with an increased duration of the signal transmission—e.g., due to a large repetition level of the CE policy—, the UE may be required to listen for a comparably long time duration at each PO and the network may be required to allocate many resources. Hence, energy consumption at the UE may be increased and resources on the spectrum can be blocked.

To mitigate such drawbacks, according to examples, characteristics of the paging procedure of the UE can be flexibly set depending on one or more parameters of the CE policy. Alternatively or additionally, according to various examples, paging characteristics of the UE can be flexibly set based on a mobility level of the UE.

Specifically, it would be possible to set a timing configuration of the DRX cycle employed by the UE. For example, the DRX cycle may be employed by the UE when operating in an idle mode in which the UE can be paged by the network. Then, it would be possible that a paging signal is transmitted by the BS and received by the UE in accordance with the timing configuration of the DRX cycle. The paging signal may be transmitted in accordance with the CE policy. For example, it would be possible that multiple repetitions of the paging signal in accordance with the repetition level of the CE policy are transmitted by the BS.

As a general rule, according to the various examples described herein, it is not only possible to set a timing configuration of a DRX cycle employed in an idle mode of the UE. It would also be possible to set a timing configuration of a DRX cycle employed in a connected mode of the UE where a data connection is maintained and it is not required to page the UE. For sake of simplicity, reference will be made to the scenario of the DRX cycle associated with the idle mode hereinafter.

As a further general rule, according to some examples, the timing configuration of one DRX cycle or of multiple DRX cycles may be set. For example, DRX cycles of different hierarchy can be employed. For example, it would be possible to employ a top-level DRX cycle and a sub-level DRX cycle: the top-level DRX cycle has ON-durations which include multiple ON-durations and multiple OFF-durations of the sub-level DRX cycle. During the OFF-durations of the top-level DRX cycle, the wireless interface of the UE may be forced to operate in the inactive state. Sometimes, the ON-durations of the top-level DRX cycle are referred to as paging time windows (PTWs), wherein each PTW includes multiple POs. In the context of 3GPP TSs, a top-level DRX cycle is sometimes referred to as enhanced DRX (eDRX) cycle and a sub-level DRX cycle is sometimes simply referred to as DRX cycle. In reference implementations, the timing configuration of a sub-level DRX cycle and/or a top-level DRX cycle is determined based on a fixed rule depending on a subscription identity—such as the 3GPP International Mobile Subscriber Identity (IMSI)—of a subscriber associated with the UE. For example, the periodicity of POs is controlled by the network via DRX timing configuration.

In case a UE has been configured with a top-level DRX cycle, the UE will activate its wireless interface after the top-level DRX cycle OFF-duration and should be ready to listen for POs of the sub-level DRX cycle during the PTW of the top-level DRX cycle. A WUS may be transmitted prior to POs, e.g., prior to the PTW or prior to multiple POs in a 1 to N mapping between WUS and POs, or prior to each PO to indicate that the UE shall listen for paging at the PO or POs.

According to various examples described herein, different aspects of the timing configuration can be set. For example, the timing configuration that is set in accordance with the parameter of the CE policy may include a periodicity of POs during which the UE is ready to listen for paging signals. In other words, the timing configuration may include a periodicity of the DRX cycle.

A further aspect of the timing configuration that can be set depending on the parameter of the CE policy can correspond to the length of the PTW, i.e., the length of the ON-duration of the top-level DRX cycle. For example, it would be possible to extend both the length of the PTW and the sub-level DRX period, but keep the number of POs per PTW fixed.

As a general rule, various qualitative and quantitative dependencies between the value of the parameter(s) of the CE policy and/or the UE mobility on one side, and the timing configuration on the other side are conceivable: For example, a UE with a high repetition level may set the timing configuration so as to receive multiple repetitions of the paging signal to meet required link budget, before it is time to read the next PO. For example, in 3GPP MTC, the maximum repetition level is 256 and 2048 repetitions (ms) for control channel (MPDCCH) and data channel (PDSCH), respectively. In a further example, a UE being configured with a large repetition level of the CE policy may set a long ON duration of the DRX cycle—e.g., a top-level DRX cycle. Then, capacity and power consumption can be optimized.

FIG. 1 schematically illustrates a cellular network 100 implementing a wireless link 114 between a UE 101 and a BS 112. As such, the cellular network 100 implements a communication system. The example of FIG. 1 illustrates the network 100 according to the 3GPP 5G architecture. Details of the fundamental architecture are described in 3GPP TS 23.501, version 1.3.0 (2017-09). While FIG. 1 and further parts of the following description illustrate techniques in the 3GPP 5G framework, similar techniques may be readily applied to different communication protocols. Examples include 3GPP LTE 4G and IEEE Wi-Fi technology.

In the scenario of FIG. 1, the UE 101 is connectable to the network 100. For example, the UE 101 may be one of the following: a cellular phone; a smart phone; an IOT device; an MTC device; a sensor; an actuator; etc.

The UE 101 is connectable to the network 100 via a radio access network (RAN) 111, typically formed by one or more BSs 112. Each BS 112 may be associated with a cell of the cellular network 100.

The wireless link 114 is established between the RAN 111—specifically between one or more of the BSs 112 of the RAN 111—and the UE 101. The wireless link 114 supports communication by implementing a multi-layer transmission protocol stack, defining the ruleset required to align the communication between participating devices 101, 112.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; non-access stratum (NAS) termination; connection management; reachability management; mobility management; access authentication; and access authorization. For example, the AMF 131 controls CN-initiated paging of the UE 101: The AMF 131 may trigger transmission of WUS and/or paging signals of the UE 101. The AMF 131 may keep track of the timing configuration of one or more DRX cycle of the UE 101. The AMF 131 may keep track of the operational mode in which the UE 101 operates, e.g., connected mode or idle mode, etc.

A data connection 189 is established by the AMF 131 if the respective UE 101 operates in a connected mode. To keep track of the current mode of the UEs 101, the AMF 131 sets the UE 101 to evolved packet system (EPS) connection management (ECM) connected or ECM idle. During ECM connected, a NAS connection is maintained between the UE 101 and the AMF 131. The NAS connection implements an example of a mobility control connection. The NAS connection may be set up in response to paging of the UE 101, using a random access (RA) transmission. The data connection 189 is established between the UE 101 via the RAN 111 and the DP 191 of the CN 115 and towards the DN 180. For example, a connection with the Internet or another packet data network can be established. A server of the DN 180 may host a service for which payload data is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

Figure 2:
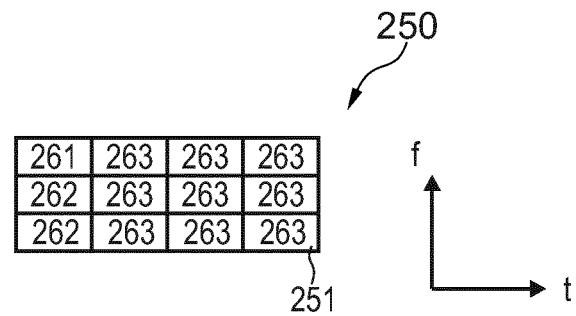
FIG. 2 schematically illustrates channels implemented on the wireless link according to various examples.

FIG. 2 illustrates aspects with respect to channels 261-263 implemented on the wireless link 114. The wireless link 114 implements a plurality of communication channels 261-263.

Resources—defined in time and frequency—can be allocated to the channels 261-263. A scheduling control message can be used to align the time-frequency position of the allocated resources between transmitter and receiver.

To avoid collision between communication on the various channels 261-263, the resources can be exclusively allocated; hence resource allocation to different channels 261-263 can be orthogonal with respect to each other. This may correspond to time division duplex (TDD) and frequency division duplex (FDD).

For example, a first channel 261 may carry reference signals, e.g., channel sounding reference signals and/or synchronization signals for acquiring the timing and frequency reference.

A second channel 262 may carry paging indicators or a WUS which enable the cellular network 100—e.g., the AMF 131 (or a MME in the 3GPP LTE framework)—to trigger transition of the UE 101 into connected mode by setting up the data connection 189. The second channel 262 may thus implement a paging control channel. An example would be the 3GPP Physical DL Control Channel (PDCCH) or a combination of WUS and PDCCH.

Further, a third channel 263 is associated with a higher-layer data, e.g., application data or higher-layer control data. For example, payload messages carrying higher-layer user-plane data packets associated with a given service implemented by the UE 101 and the BS 112 can be communicated on the third channel 263. User-data messages may be transmitted via the payload channel 263. Layer 3 or RRC control messages may be transmitted via the third channel 263, e.g., a paging message. An example would be the 3GPP Physical DL Shared Channel (PDSCH).

Figure 3:
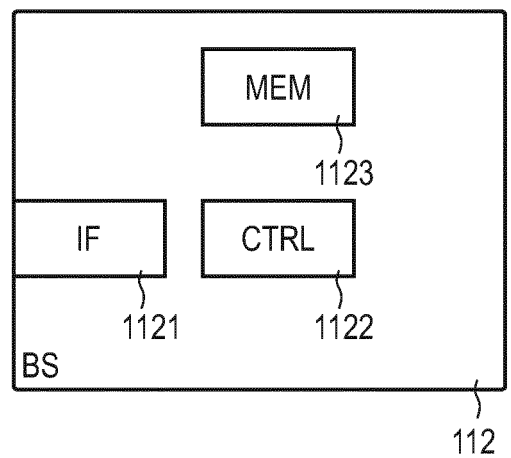
FIG. 3 schematically illustrates the BS according to various examples.

FIG. 3 schematically illustrates a BS 112 of the RAN 111 (cf. FIG. 1). The BS 112 includes a wireless interface 1121. For example, the wireless interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: participating in a paging procedure of the UE 101; determining a parameter of a CE policy employed by the UE 101; setting a timing configuration of a DRX cycle of the UE 101; transmitting and/or receiving on the wireless link 114; etc.

Figure 4:
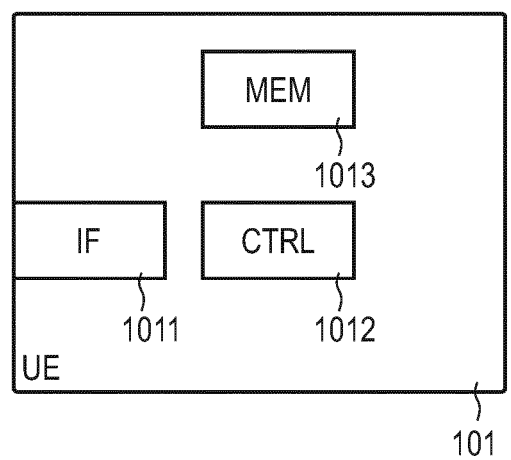
FIG. 4 schematically illustrates the UE according to various examples.

FIG. 4 schematically illustrates the UE 101. The UE 101 includes a wireless interface 1011. For example, the wireless interface 1011 may include an analog front end and a digital front end. The wireless interface 1011 may include an analog front end and a digital front end, respectively. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: determining a parameter of a CE policy employed by the UE 101; participating in a paging procedure of the UE 101; setting a timing configuration of a DRX cycle of the UE; transmitting and/or receiving on the wireless link 114; etc.

Figure 5:
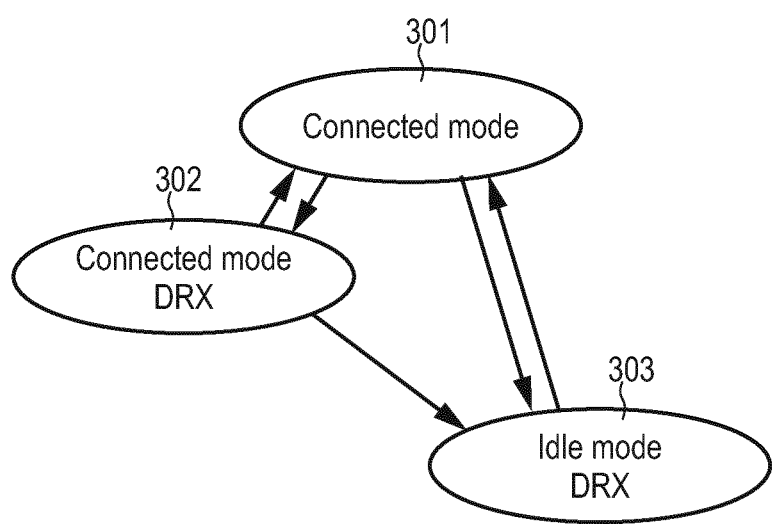
FIG. 5 schematically illustrates multiple operational modes in which the UE can operate according to various examples.

FIG. 5 illustrates aspects with respect to different modes 301-303 in which the UE 101 can operate. FIG. 5 also illustrates aspects with respect to association of communication of WUSs and paging signals with the various modes 301-303. Example implementations of the operational modes 301-303 are described, e.g., in 3GPP TS 38.300, e.g., version 15.0.

During connected mode 301, the data connection 189 is setup. For example, a default bearer and optionally one or more dedicated bearers may be set up between the UE 101 and the network 100. The wireless interface 1011 of the UE 101 may persistently operate in an active state.

In order to reduce the power consumption, it is then possible to transition from the connected mode 301 to a connected mode 302 which employs a DRX cycle. The DRX cycle includes ON-durations and OFF-durations. During the OFF-durations, the wireless interface 1011 is unfit to receive data; an inactive state may be activated. The timing configuration of the DRX cycle is synchronized between the UE 101 and the BS 112 such that the BS 112 can align any DL transmission with the ON-durations of the connected mode DRX cycle. The data connection 189 is maintained set-up in mode 302.

As a general rule, during the connected modes 301, 302, CE policy reporting may be used. Hence, the UE 101 may report one or more parameters of the CE policy currently employed by the UE. This may be different in an idle mode 303; here, CE policy reporting may be disabled. For example, higher-layer control signaling such as RRC control signaling may be employed for to communicate uplink data associated with the CE policy reporting. As example, in idle mode the UE may implement different characteristics of the paging procedure depending on one or more parameters of the CE policy without specific indication of the CE policy or the paging procedure characteristics to the network.

As a general rule, different implementations of the CE policy reporting are conceivable. For example, to synchronize the repetition level between UE and BS, the UE may initially connect using resources allocated per repetition level; then, the network knows initial repetition level based on the resource selection of the UE. Then, when in connected mode, based on UE reporting of channel quality, etc., the network can control the repetition level, e.g., using DL control signaling.

To achieve a further power reduction, it is possible to implement the idle mode 303. The idle mode 303 is associated with a DRX cycle. However, during the ON-durations of the DRX cycle in idle mode 303, the main receiver 1351 is only fit to receive paging indicators and, optionally, paging messages and/or WUSs. For example, this may help to restrict the particular bandwidth that needs to be monitored during the ON-durations of the DRX cycles in idle mode 303. This may help to further reduce the power consumption—e.g., if compared to the connected mode 302. In the idle mode 303, the data connection 189 is not maintained, but released.

When operating the UE 101 in idle mode, the network may be able to determine the repetition level of the UE based on statistical information of previous reports. For example, it can be considered whether the UE has been frequently changing the repetition level or has been using a static repetition level, etc.

Figure 6:
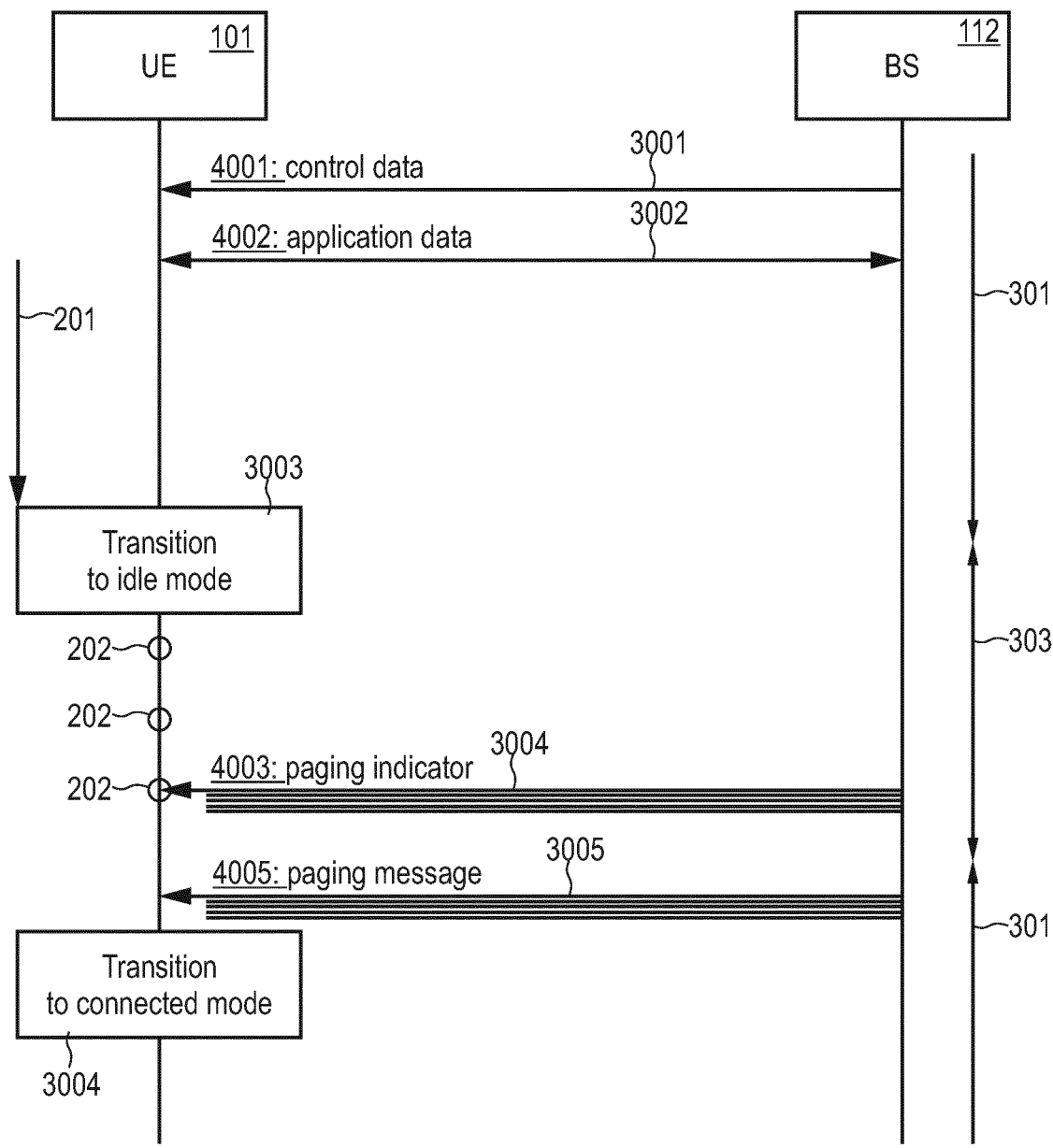
FIG. 6 schematically illustrates a paging procedure which is in accordance with a timing configuration of a DRX cycle according to various examples.

Details with respect to an exemplary transition between modes 301 and 303 are illustrated in FIG. 6.

FIG. 6 is a signaling diagram of communication on the wireless link 114 between the UE 101 and the BS 112. Initially, the UE 101 operates in connected mode 301. Here, at 3001, control data 4001 is transmitted by the BS 112 and received by the UE 101. For example, a RRC control message may be used to communicate the control data 4001. At 3002, application-layer data 4002—also referred to as user data or payload data—is transmitted by the BS 112 and received by the UE 101. It would be possible that the control data 4001 and the application data 4002 are both communicated on the PDSCH 263. The data connection 189 is employed to communicate the data 4001, 4002.

Then, there is no more data to be communicated employing the data connection 189. An inactivity timer 201 thus expires and triggers the transition from the connected mode 301 to the idle mode 303, at 3003. Here, the data connection 189 is released, e.g., using RRC control signaling (not illustrated in FIG. 6).

Upon transitioning into operation in the idle mode 303, a DRX cycle is activated. The ON-durations of the DRX cycle define POs 202. The UE 101 implements multiple POs 202 in which it is configured to listen for a paging signal implemented by a paging indicator. Only at the third PO 202, the paging indicator 4003 is transmitted by the BS 112 and received by the UE 101, 3004.

In response to receiving the paging indicator 4003 the BS 112, at 3005, transmits a paging message 4005. The paging message 4005 is transmitted using the PDSCH 263, on resources indicated by the paging indicator 4003. The paging message 4001 can be indicative of an identity of the UE 101.

Then, in response to receiving the paging message 4005, the UE 101 transitions into the connected mode, 3004. This involves establishment of the data connection 189. For establishing the data connection 189, a random access procedure including transmission of a UL random access preamble can be employed.

As illustrated in FIG. 6, multiple repetitions of the paging signals 4003, 4005 are communicated from the BS 112 to the UE 101, in accordance with a repetition level of a CE policy applied by the UE 101.

As a general rule, multiple repetitions of a signal communication in accordance with the repetition level of the CE policy may be communicated within one or multiple transmission frames defined on the wireless link 114. Frequency hopping may or may not be employed. There may be time gaps in-between subsequent repetitions. The multiple repetitions may all be in accordance with the same redundancy version. Details of the specific redundancy version can also be specified by one or more parameters of the CE policy: A raw signal includes a sequence of bits. Encoding the raw signal according to a given redundancy version can include adding a checksum to the sequence of bits of the raw signal. Alternatively or additionally, encoding the signal can include to applying spreading. Alternatively or additionally, encoding the signal can include shuffling and/or interleaving. Different techniques of encoding can be employed such as, e.g., Reed Solomon encoding, turbo convolutional encoding, convolutional coding, polar coding, etc.

Figure 7:
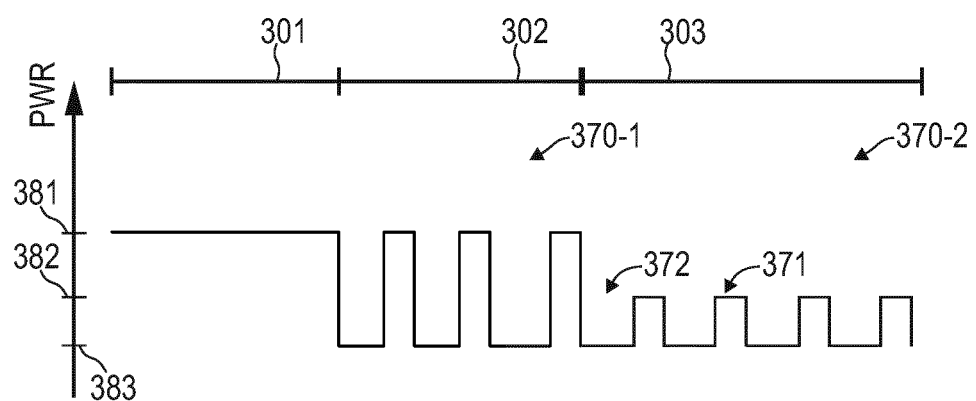
FIG. 7 schematically illustrates the timing configuration of the DRX cycle according to various examples.

FIG. 7 schematically illustrates aspects with respect to different states of the wireless interface 1011 of the UE 101 that can be activated in accordance with the modes 301-303.

Initially, the UE 101 operates in the connected mode 301. The wireless interface 1011 of the UE 101 is persistently in the active state 381 in which it can communicate with the network 100 via the data connection 189.

Then, the UE 101 transitions into operation in the connected mode 302. The connected mode 302 is associated with a DRX cycle 370-1. The DRX cycle 370-1 includes ON-durations and OFF-durations. The active state 381 is activated during the ON-durations. An inactive state 383 is activated during the OFF-durations. Throughout the operation in the connected mode 302, the data connection 189 is maintained established.

Then, the UE 101 transitions into operation in the idle mode 303. Here, the data connection 189 is released. The idle mode 303 is associated with a further DRX cycle 370-2, including ON-durations 371 and OFF-durations 372. During the ON-durations 371 of the DRX cycle 370-2, the active state 382 is activated; here, the wireless interface 1011 can receive paging signals, specifically paging indicators 4003 on the PDCCH; but may not be able to communicate data via the data connection. Upon receiving a paging indicator 4003, the active state 381 may be activated.

In some examples, the DRX cycle 370-2 may optionally be combined with a further DRX cycle; i.e., a top-level DRX cycle may be combined together with the sub-level DRX cycle 370-2.

Details with respect to the timing configuration of the DRX cycle 370-2 are described in connection with FIG. 8.

Figure 8:
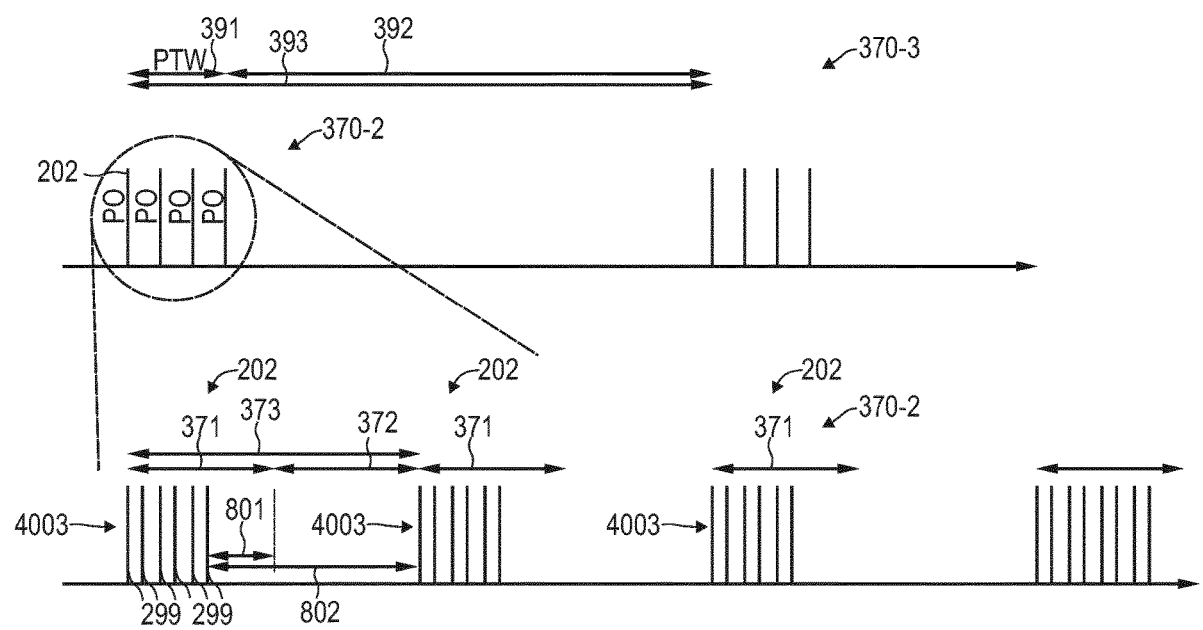
FIG. 8 schematically illustrates the timing configuration of the DRX cycle according to various examples.

FIG. 8 schematically illustrates aspects with respect to a timing configuration of a sub-level DRX cycle 370-2 and a top-level DRX cycle 370-3. The top-level DRX cycle 370-3 includes ON-durations 391, i.e., PTWs. The top-level DRX cycle 370-3 also includes OFF-durations 392. FIG. 8 also illustrates a periodicity 393 of the top-level DRX cycle 370-3

During the OFF-durations 392, the wireless interface 1011 is persistently operated in the inactive state 383 (cf. FIG. 7). During the ON-durations 391, the sub-level DRX cycle 370-2 is employed. The ON-durations 391 define PTWs. This is illustrated by the inset of FIG. 8. The sub-level DRX cycle 370-2 includes the ON-durations 371 and the OFF-durations 372. The ON-durations 371 correspond to the POs 202. FIG. 8 also illustrates the periodicity of the sub-level DRX cycle 370-3.

FIG. 8 also illustrates aspects with respect to transmission of multiple repetitions 299 of the paging signal such as the paging indicator 4003 within a PO 202, i.e., during the ON-durations 371.

The count of repetitions 299 is set by the repetition level of the CE policy. Illustrated in FIG. 8 is a scenario in which the burst of repetitions 299 according to the repetition level is finished at a time offset 801 prior to the next of the PO 202. This gives the UE 101 a total time duration 802 until the start of the subsequent PO 202 (decoding time duration 802); the UE 101 has the decoding time duration 802 available for decoding the multiple repetitions 299.

According to examples, the timing configuration of the top-level DRX cycle 370-3 and/or the timing configuration of the sub-level DRX cycle 370-2 and/or of the connected mode DRX cycle 370-1 can be flexibly set, e.g., depending on one or more parameters of the CE policy such as the repetition level and/or depending on the mobility of the UE 101.

Based on respective UL control signaling indicative of the parameters of the CE policy, the network 100 can be aware of the respective one or more parameters of the CE policy; hence, the timing configuration can be set at the network. Likewise, the UE 101 is aware of the respective one or more parameters of the CE policy and can set the timing configuration accordingly. Thus, synchronized setting of the timing configuration at the UE 101 and the BS 112 or, generally, at the network 100 is possible. This facilitates adjusting the paging procedure in accordance with the timing configuration. Details with respect to such a dynamic setting of the timing configuration of one or more DRX cycles are illustrated in FIG. 9.

Figure 9:
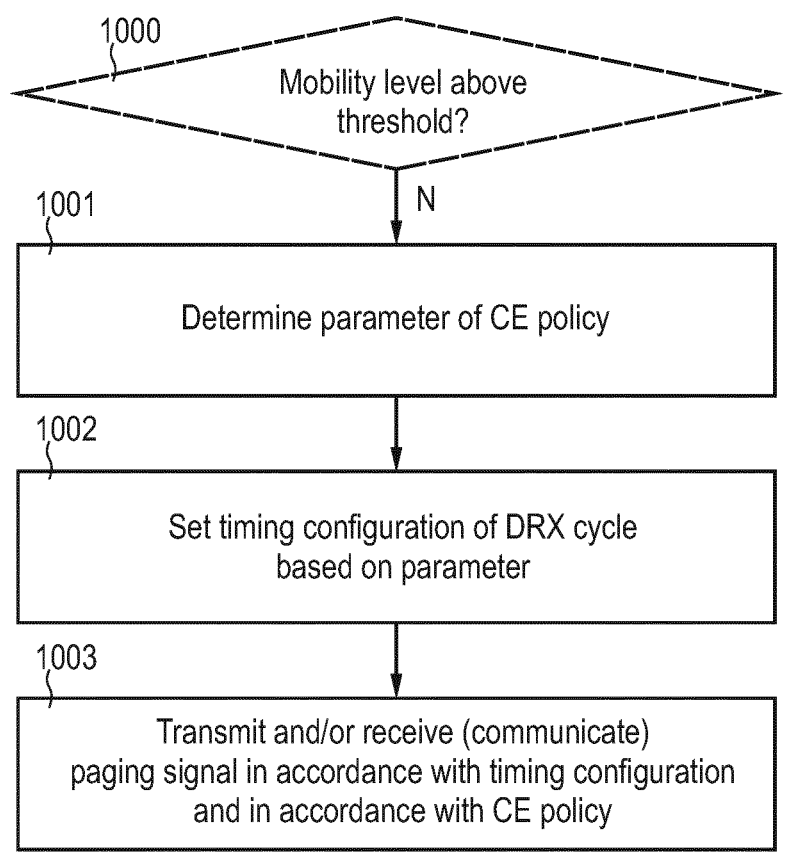
FIG. 9 is a flowchart of a method according to various examples.

FIG. 9 is a flowchart of a method of setting a timing configuration of a DRX cycle according to various examples. For example, the method of FIG. 9 may be executed by the control circuitry 1122 of the BS 112. Alternatively or additionally, the method of FIG. 9 may be executed by the control circuitry 1012 of the UE 101.

At block 1000—which is an optional block—, a mobility level of the UE is compared with a threshold. This can be done based on one or more location reports and/or location measurements at the BS 112 or another network node. The UE 101 can also perform such check of the mobility level based on mobility measurements.

If the mobility level is not above the threshold—i.e., the UE is static—, then the method commences in block 1001.

Then, a parameter of a CE policy is determined, block 1001. More specifically, a current value of the parameter of the CE policy may be determined.

Block 1001 can be implemented in different ways. For example, for an implementation at the UE, a current quality of communicating on the wireless link can bet determined; based on this, according to predefined rules, the parameter is determined. The BS can rely on CE policy reporting. In idle mode where CE policy reporting may be disabled, the UL report data of the CE policy reporting may be old; however since block 1001 may be executed for UEs having a small mobility level, the UL report data may still be valid. Hence, the BS may have an up-to-date indication of the parameter of the CE policy employed by the UE, even when the UE is operated in idle mode.

Generally, different parameters of the CE policy can be determined at block 1001.

For example, the parameter may include the repetition level (cf. FIG. 8 where multiple repetitions 299 of the paging indicator 4003 are communicated in accordance with the repetition level).

As a further example, the parameter may include a spreading factor, a checksum length, and the transmit power level.

Next, at block 1002, the timing configuration of the DRX cycle—or generally of one or more DRX cycles—is set based on the parameter as determined at 1001. From FIG. 9 it follows, that this setting of the timing configuration based on the CE policy is selectively executed depending on the mobility level of the UE, if block 1000 is implemented. Thereby, errors are avoided in cases where the BS does not have an up-to-date indication of the parameter of the CE policy available.

As a general rule, various strategies are available for adjusting the paging procedure by setting the timing configuration at block 1002. One example strategy is explained and illustrated in connection with FIG. 10.

Figure 10:
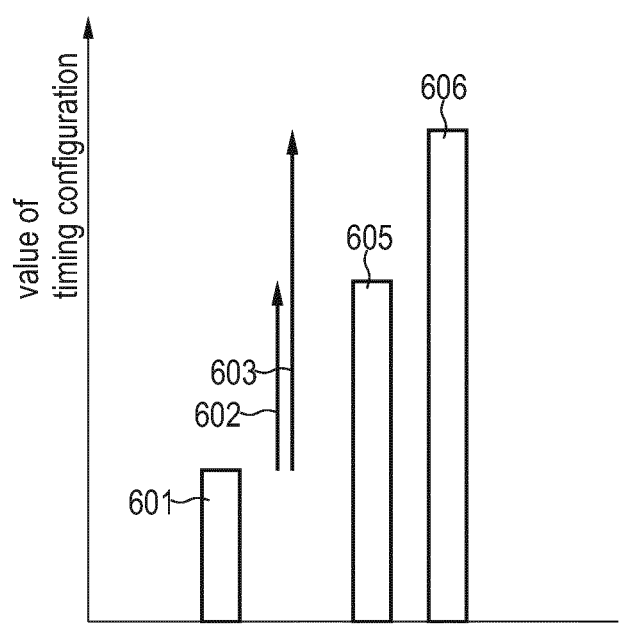
FIG. 10 schematically illustrates setting the timing configuration of the DRX cycle according to various examples.

FIG. 10 illustrates aspects in connection with setting the timing configuration of the DRX cycle based on the parameter of the CE policy. In the example of FIG. 10, the timing configuration is set to either the value 605 or the value 606, based on a default setting 601 and a preconfigured mapping 602, 603.

A specific example is given that illustrates this general concept. For example, the relevant parameter of the CE policy considered by the mapping 602, 603 may be the repetition level (but it may generally be any other parameter such as transmit power, scrambling factor, etc.). Further, the aspect of the timing configuration that is set may be the ON duration of a DRX cycle (but it may generally be any other aspect of the timing configuration). The mapping 602, 603 may then map the default setting 601 of the ON duration—e.g., 24 ms ON duration—to the specific value 605, 606 to which the ON duration is to be set—e.g., 240 or 480 ms ON duration; the mapping 602, 603 hence depends on the repetition level, i.e., the mapping may define how the default setting 601 of the ON duration is adjusted in view of a given repetition level. For example, the default setting 601 may be scaled using a larger or smaller scaling factor depending on the repetition level; the scaling factor may be defined by the mapping 602, 603. In the concrete example given, the ON duration of 24 ms may be scaled by the scaling factor 10 or by the scaling factor 20, depending on the repetition level.

Generally, the default setting 601 may specify a reference timing configuration. The default setting 601 may be fixedly configured. For example, the default setting 601 may be parametrized, e.g., depending on the subscriber identity of the user associated with the UE; then, for different subscriber identities, different default settings 601 may be used.

The mapping 602, 603, in the scenario FIG. 10, applies a scaling factor to the default setting 601, to thereby yield the specific timing configuration 605 or 606 to be set. The scaling factor may, e.g., depend on the repetition level; for example, for a larger (smaller) repetition level, a larger (smaller) scaling factor can be used. Thus, a repetition-level-dependent scaling factor may be applied to the default setting 601. For example, if the default setting 601 corresponds to a reference periodicity of the DRX cycle, then the repetition-level-dependent scaling factor may be applied to the reference periodicity.

According to some examples, it would be possible that control data indicative of the default setting 601 and/or the mapping 602, 603 is communicated between the BS 112 and the UE 101. Thereby, the network may configure the default setting 601 and/or the mapping 602, 603. A two-way negotiation would be possible.

For example, higher-layer control data can be used, e.g., the control data 4001 communicated during connected mode 301, 302 (cf. FIG. 6). It would also be possible to broadcast cell-specific value for the default setting 601 and/or the mapping, e.g., using a system information block, etc.

For example, the control data indicative of the default setting 601 and/or the mapping 602, 603 may be: (i) Cell specific, e.g., included in/controlled by broadcasted system information; (ii) UE-type specific, e.g. for a specific UE category; or UE specific, e.g., signaled in a RRC control message.

The control data can be indicative of which particular aspect of the timing configuration should be set depending on the parameter and, optionally, can be indicative of how to set the particular aspect of the timing configuration. For example, the control data can be indicative of a mapping to use, and whether or not the PTW length and/or the periodicity of the DRX cycle should be set based on the CE policy.

FIG. 10 illustrates a scenario in which the mapping 602, 603 results in the timing configuration 605, 606 to have a value that is larger than the default setting 601. As a general rule, various kinds and types of mappings may be used, including such which result in a timing configuration that has a value which is smaller than the default setting 601.

Further, as a general rule, the mapping may implement a linear or non-linear dependency of the timing configuration as a function of the parameter of the CE policy, e.g., as a function of the repetition level.

Referring to FIG. 9 again: At block 1003, the BS transmits a paging signal in accordance with the newly-set timing configuration and in accordance with the CE policy. Alternatively or additionally, the UE receives the paging signal in accordance with the newly-set timing configuration and in accordance with the CE policy.

As a general rule, various aspects of the timing configuration can be set based on the parameter of the DRX policy at block 1002.

For example, the ON-duration of a DRX cycle may be set. More specifically, the length of the ON-duration may be set. For example, the ON-duration 371 of a DRX cycle 370-2 defining a PO may be set (cf. FIG. 8).

Alternatively or additionally, the OFF-duration of a DRX cycle may be set. More specifically, the length of the OFF-duration may be set. For example, the OFF-duration 372 of a DRX cycle 370-2 may be set, thereby defining a time in-between POs (cf. FIG. 8).

Alternatively or additionally, the periodicity of a DRX cycle may be set. Alternatively or additionally, a duty cycle of a DRX cycle may be set. Thereby, a frequency of occurrence of POs may be set.

Further, as a general rule, the timing configuration of one or more DRX cycles may be set. For example, scenarios are conceivable where the timing configuration of multiple DRX cycles associated with different modes in which the UE can operate are set. For example, the timing configuration of the DRX cycle 370-1 of the connected mode 302 may be set and/or the timing configuration of one or more DRX cycles 370-2, 370-3 of the idle mode 303 may be set (cf. FIG. 7 and FIG. 8).

Further, scenarios are conceivable where a timing configuration of a top-level DRX cycle 370-3 and/or a timing configuration of a sub-level DRX cycle 370-2 is set (cf. FIG. 8). For example, it would be possible that the OFF-duration 372 of the sub-level DRX 37-2 cycle is set, i.e., the duration between adjacent POs. Alternatively or additionally, it would be possible that the ON-duration 392 of the top-level DRX cycle 370-3 is set, i.e., the length of the PTW.

For example, the UE could scale the length of the PTW as a function of the repetition level of the CE policy. Thus, the PTW length is not only a function of the subscriber identity, as in reference implementations. The length of the PTW can correspond to how many POs a UE listens to during an ON-duration of the top-level DRX cycle. As an example, a longer PTW would mean that the network can get more POs to reach the UE before it activates the OFF-duration of the top-level DRX cycle. This means that the network can facilitate a UE having sufficient opportunities to listen to paging signals in case it is in a bad coverage and/or missed a PO due to decoding of previously received repetitions of signals which can extended over the two consecutive POs. Hence the network can in this manner control e.g. the reliability of the paging procedure in a greater detail. The network may configure a reference PTW as a default setting, which the UE could adapt based on the repetition level, using the mapping (cf. FIG. 10).

As a further example, the time between POs—i.e., the OFF-duration of the sub-level DRX cycle—may be set based on the repetition level. In such implementation, the UE can expect the PO to come with different periodicity based on the utilized repetition level, and the timing configuration—as described above—does not only depend on the subscriber identity. A scaling of the time between subsequent POs may have an impact on the paging reliability since a longer time-offset between POs can facilitate the UE having sufficient time to decode multiple repetitions of a signal communicated in accordance with the CE policy after a PO and before the subsequent PO starts.

As a still further example, the timing configuration can be set such that the UE is only required to monitor POs every n-th ON-duration of a DRX cycle, where n is an integer: e.g., every second ON-duration, every third ON-duration can be monitored by the UE. For example, thereby, the time between subsequent POs can be doubled or multiplied. This could be implemented by scaling the default setting formula used for PO calculation with a mapping factor based on the repetition level and the corresponding number of repetition. Tdrx=n*Tdrx_default_setting (cf. FIG. 10). Thus, generally, the default setting can include a reference periodicity of the DRX cycle and the mapping can include a repetition-level-dependent scaling factor of the reference periodicity.

It is generally not required in all scenarios to employ a default setting and a mapping. For example, the timing configuration can be set depending on the decoding time duration, i.e., the time duration between the end the repetition burst including multiple repetitions of the paging signal of a first PO and a subsequent second PO (cf. FIG. 8: decoding time duration 802). The decoding time duration can be compared with a predefined threshold in a threshold comparison. Then, the decoding time can be increased, if needed, depending on a result of the threshold comparison: For example, the decoding time duration can be required to be larger or equal to K % of the DRX cycle periodicity, where K is a predefined number.

Summarizing, above techniques have been described that facilitate adapting a UE paging procedure based a CE policy and/or a UE mobility level. For example, the PTW and/or the frequency of POs can be adapted.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been describing in which the timing configuration of a DRX cycle activated in an idle mode is set depending on the CE policy and/or the UE mobility level. Such techniques may be readily applied to setting the timing configuration of a DRX cycle activated in a connected mode, e.g., 3GPP DRX connected mode.

For further illustration, above, various examples have been described in which the timing configuration of a DRX cycle is set depending on a parameter of a CE policy. Alternatively or additionally, the timing configuration of the DRX cycle may be set depending on the UE mobility level.

For still further illustration, above various examples have been described in which paging signals are communicated in accordance with the CE policy, e.g., using multiple repetitions of the paging signals. Alternatively or additionally other kinds and types of signals can be communicated in accordance with the CE policy, e.g., signals encoding application data or signals encoding high-layer control data.

The invention claimed is:

1. A method, comprising:
determining a parameter of a coverage enhancement policy employed by a communication system,
setting a timing configuration of a discontinuous reception cycle employed by a terminal of the communication system depending on the parameter, and
communicating a paging signal in accordance with the timing configuration of the discontinuous reception cycle and the coverage enhancement policy,
wherein the timing configuration is set based on a default setting and a preconfigured mapping, wherein the preconfigured mapping maps the default setting to the timing configuration in accordance with the parameter of the coverage enhancement policy.

2. The method of claim 1,
wherein the parameter comprises a repetition level of multiple repetitions of signals communicated by the terminal.

3. The method of claim 1, further comprising:
communicating, between an access node of the communication system and the terminal, control data indicative of at least one of the default setting and the mapping.

4. The method of claim 1, wherein the parameter comprises a repetition level of multiple repetitions of signals communicated by the terminal,
wherein the default setting comprises a reference periodicity of the discontinuous reception cycle,
wherein the mapping comprises a repetition-level-dependent scaling factor of the reference periodicity.

5. The method of claim 1,
wherein the timing configuration comprises at least one of an ON duration, an OFF duration, and a periodicity of the discontinuous reception cycle.

6. The method of claim 1,
wherein the discontinuous reception cycle comprises a top-level discontinuous reception cycle having respective ON durations and OFF durations,
wherein the discontinuous reception cycle further comprises a sub-level discontinuous reception cycle having respective ON durations and OFF durations,
wherein an ON duration of the top-level discontinuous reception cycle comprises multiple ON durations of the sub-level discontinuous reception cycle,
wherein the timing configuration comprises the ON duration of the top-level discontinuous reception cycle.

7. The method of claim 1,
wherein the parameter comprises a repetition level of multiple repetitions of signals communicated by the terminal,
wherein the method further comprises:
based on the repetition level: determining a time duration available for decoding the multiple repetitions of the paging signal,
implementing a threshold comparison between the determined time duration and a predefined threshold,
wherein the timing configuration is set depending on a result of the threshold comparison.

8. The method of claim 1,
determining a mobility level of the terminal,
wherein the timing configuration is further set depending on the mobility level.

9. The method of claim 1,
determining a mobility level of the terminal, and selectively executing said setting of the timing configuration based on the coverage enhancement policy depending on the CE level.

10. The method of claim 1,
wherein the parameter comprises at least one of a spreading factor, a checksum length, and a transmit power level.

11. A device configured to:
determine a parameter of a coverage enhancement policy employed by a communication system,
set a timing configuration of a discontinuous reception cycle employed by a terminal of the communication system depending on the parameter, and
communicate a paging signal in accordance with the timing configuration of the discontinuous reception cycle and the coverage enhancement policy,
wherein the timing configuration is set based on a default setting and a preconfigured mapping, wherein the preconfigured mapping maps the default setting to the timing configuration in accordance with the parameter of the coverage enhancement policy.

12. The device of claim 11,
wherein the device is a terminal or a base station of a cellular network.

\* \* \* \* \*